(No Model.) 2 Sheets—Sheet 1.

L. A. GREGG.
ORCHARD CULTIVATOR.

No. 413,443. Patented Oct. 22, 1889.

Witnesses,
Geo. H. Strong.
J. H. Nurse.

Inventor,
Leslie A. Gregg,
By Dewey & Co.
Attys (No Model.) 2 Sheets—Sheet 2.

L. A. GREGG.
ORCHARD CULTIVATOR.

No. 413,443. Patented Oct. 22, 1889.

Witnesses,
Geo. H. Strong
[signature]

Inventor:
Leslie A. Gregg
By Dewey & Co.
Attys

UNITED STATES PATENT OFFICE.

LESLIE A. GREGG, OF SAN JOSÉ, CALIFORNIA, ASSIGNOR OF ONE-HALF TO F. PLANK, OF SAME PLACE.

ORCHARD-CULTIVATOR.

SPECIFICATION forming part of Letters Patent No. 413,443, dated October 22, 1889.

Application filed June 10, 1889. Serial No. 313,705. (No model.)

*To all whom it may concern:*

Be it known that I, LESLIE A. GREGG, of San José, Santa Clara county, State of California, have invented an Improvement in Orchard-Cultivators; and I hereby declare the following to be a full, clear, and exact description of the same.

My invention relates to that class of cultivators especially adapted for orchards, in which a wheeled frame carries a number of freely-suspended teeth or lags, and provided with devices for raising and lowering them; and my invention consists in freely-suspended and laterally-swinging side teeth or lags and means for raising and lowering them and moving them in and out from the sides of the frame, all of which I shall hereinafter fully describe.

The object of my invention is to provide a cultivator the working width of which can be readily and instantly varied by throwing or swinging said side teeth or lags farther out or drawing them in, as occasion requires, thereby cultivating the ground between the trees of an orchard and avoiding said trees successively.

Figure 1:
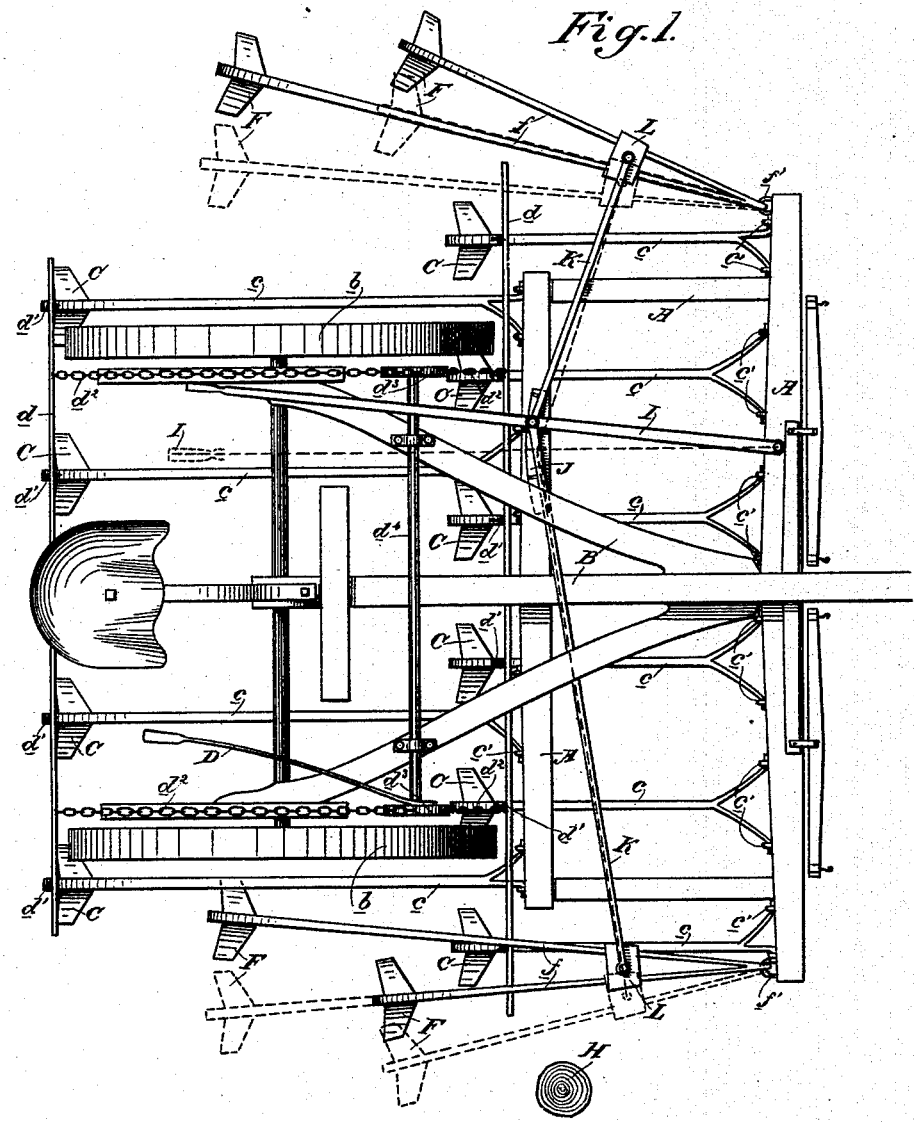
Figure 2:
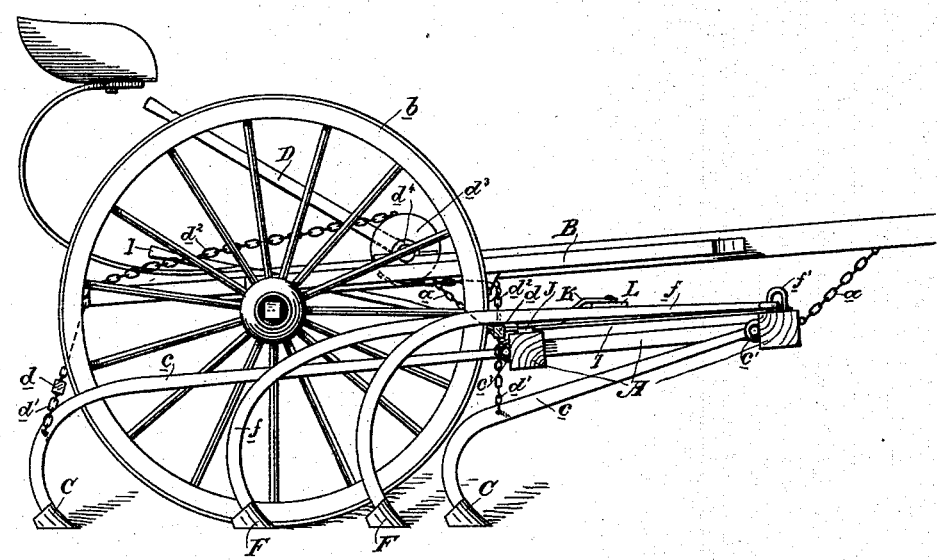

Referring to the accompanying drawings for a more complete explanation of my invention, Figure 1 is a plan of my cultivator. Fig. 2 is a side elevation of the same.

A frame (designated by A A) is suspended by chains $a$ from the tongue and hounds B of the cultivator-carriage, of which $b$ are the wheels, thus making the movement of the cultivator as free from the jar of the wheels as possible. From this frame A A are hung two rows of main teeth or lags C by means of standards or shanks $c$, the forward ends of which are pivoted in staples $c'$, or other connections, so that the said teeth or lags each are independent in action to follow the inequalities of the ground, and their standards or shanks are of such a length that one set of teeth or lags precedes the wheels $b$ and the other set follows them. The teeth or lags have their shanks or standards fastened to the lifting-rods $d$ by short chains $d'$, and said rods in turn are connected by chains $d^2$ to the eccentrics $d^3$ on a rock-shaft $d^4$, operated by the handle or lever D, by which the whole number of teeth or lags may be lifted from the ground by throwing the handle or lever to the front. When they are in the ground, the lever lies in a horizontal position, pointing backwardly, and out of the way of the limbs of trees overhead.

From each end of the front timber of the frame A extend the shanks or standards $f$ of the side teeth or lags F, two being here shown on each side. The connection is a free pivotal one, and is made in suitable manner, as by hooking the ends of the standards or shanks into staples $f'$ on the ends of the front timber, whereby the side teeth or lags are freely suspended, and may have not only a vertical movement to accommodate themselves to inequalities of the ground, but may have a hinged or swinging movement to throw them outwardly or throw them inwardly, as occasion requires. The lateral or side movement of these teeth or lags is controlled and effected by the connecting-rods K, which are fastened to plates L, secured between the pair of standards or shanks of the side teeth on each side, and have their ends connected with the pivoted lever I, the position of which may be controlled and regulated by a rack J. When these side teeth or lags are in their proper position, they track in the position shown in the dotted lines, Fig. 1, beyond any part of the frame-work of the cultivator, thus allowing the ground to be stirred between the trees of the row. Upon approaching a tree, which is here designated as H, the lever I is operated, so as to throw the side teeth or lags on that side inwardly, thereby avoiding the tree. When past the tree, they are thrown out again. The vertical movement of the side teeth is effected by means of the forward lifting-rod $d$, which passes under their shanks, and as said rod is connected by chains with the eccentrics $d^3$ these teeth are raised and lowered by the same lever D which raises and lowers the rest of the teeth.

The advantage of this cultivator is greater adaptability for orchard-work, because of its great width, which allows the outside teeth to work to the row of trees, while the horses are away from the low, overhanging limbs. The independent vertical action of all the teeth or lags allows a wider surface to be tilled with the same draft as a narrower cultivator set in a stiff frame. The position of the lags or teeth in front and behind the wheels gives perfect balance to the cultivator in all positions, and the addition of the independent side lags or teeth F allows cleaner work between the trees, and by their peculiar construction and connection allows quicker adjusting and gives greater safety to the trees. These outside teeth or lags may be easily taken off, so as to enable the entire implement to be narrowed for use in narrower rows of vineyards.

Having thus described my invention, what I claim as new, and desire to secure by Letters Patent, is—

1. In an orchard-cultivator, the main frame carrying the series of main teeth or lags, in combination with the laterally-swinging teeth F on each side of said main frame, a hand-lever, and connections from the hand-lever to the swinging teeth, whereby the latter may be laterally and vertically moved, substantially as described.

2. In an orchard-cultivator, the main frame and the main teeth carried thereby, in combination with the independent side teeth F, the standards or shanks $f$ thereof, a pivotal connection between the forward ends of said standards or shanks and the frame, whereby said teeth may have a vertical and lateral movement, the pivoted lever I, and the connecting-rods K, whereby the said teeth are moved laterally, substantially as described.

3. In an orchard-cultivator, and in combination with the main frame having a series of main teeth, the pivotally-connected side teeth F on each side of said frame, the lever I and connecting-rods K, for effecting their lateral movement, and the lifting-rod, chains, eccentrics, rock-shaft, and lever for effecting their vertical movement, substantially as described.

4. An orchard-cultivator consisting of the wheeled frame, the frame A, supported from said wheeled frame by means of chains, pivotally-connected gravity teeth or lags carried by said last-named frame and in front of and behind the wheels, the pivotally-connected and swinging side teeth or lags F, the lever I and the connecting-rods K, for effecting the lateral movement of said side teeth or lags, and the lifting-rods, chains, eccentrics, rock-shaft, and lever for giving a vertical movement to all of the teeth or lags, substantially as described.

In witness whereof I have hereunto set my hand.

LESLIE A. GREGG.

Witnesses:
C. M. WOOSTER,
H. L. WOODBURN.